(12) United States Patent
Otani et al.

(10) Patent No.: US 7,532,637 B2
(45) Date of Patent: May 12, 2009

(54) SYNCHRONOUS CONTROLLER

(75) Inventors: Shuji Otani, Takata-gun (JP);
Masakazu Komatsu, Mishima (JP);
Yasuhiro Mori, Mishima (JP)

(73) Assignee: OMRON Corporation, Kyoto (JP)

( * ) Notice: Subject to any disclaimer, the term of this patent is extended or adjusted under 35 U.S.C. 154(b) by 818 days.

(21) Appl. No.: 11/077,109

(22) Filed: Mar. 9, 2005

(65) Prior Publication Data

US 2005/0201408 A1 Sep. 15, 2005

(30) Foreign Application Priority Data

Mar. 11, 2004 (JP) ............................ P2004-069786

(51) Int. Cl.
*H04L 12/40* (2006.01)
(52) U.S. Cl. ........................ 370/438; 710/314; 700/19
(58) Field of Classification Search ............ 700/19–21, 700/14, 28, 169, 174; 251/30.05; 137/624; 370/438; 710/110, 314, 3
See application file for complete search history.

(56) References Cited

U.S. PATENT DOCUMENTS

| 4,375,639 | A | * | 3/1983 | Johnson, Jr. ................ 710/114 |
| 5,199,106 | A | * | 3/1993 | Bourke et al. .............. 710/110 |
| 6,219,735 | B1 | * | 4/2001 | Kondo et al. ............... 710/110 |
| 6,247,101 | B1 | * | 6/2001 | Settles ........................ 711/145 |
| 6,343,549 | B1 | * | 2/2002 | Tokiwa ........................ 101/248 |
| 6,510,484 | B1 | * | 1/2003 | Kim et al. ................... 710/314 |
| 6,601,505 | B2 | * | 8/2003 | Tokiwa ........................ 101/218 |
| 6,897,626 | B2 | * | 5/2005 | Fujibayashi et al. ........... 318/85 |
| 2003/0101299 | A1 | * | 5/2003 | Kondo et al. ................ 710/110 |
| 2004/0002778 | A1 | | 1/2004 | Giamona et al. |

FOREIGN PATENT DOCUMENTS

| EP | 1014271 | 6/2000 |
| JP | 11-259105 | 9/1999 |
| JP | 2001-331222 | 11/2001 |
| JP | 2003-202907 | 7/2003 |

OTHER PUBLICATIONS

Japanese Examination Report dated Jan. 17, 2006.
EP patent application No. 05005178.8-1239, European Search Report mailed Feb. 27, 2007.

* cited by examiner

*Primary Examiner*—Kidest Bahta
(74) *Attorney, Agent, or Firm*—Weaver Austin Villeneuve & Sampson LLP

(57) ABSTRACT

A synchronous controller is formed with a cycle master module and one or more control modules doubly connected through a synchronous bus and an event bus. The event bus is used for transmitting data with a larger volume. The control modules each cyclically carry out execution of a user program for controlling an object apparatus to be controlled. The cycle master module exchanges data with the control modules through the event bus and the synchronous bus. Each of the control modules carries out one cycle of the execution of the user program by using reception of synchronous data transmitted from the cycle master module through the synchronous bus as a trigger.

15 Claims, 7 Drawing Sheets

SYNCHRONOUS CONTROLLER

Priority is claimed on Japanese Patent Application 2004-069786 filed Mar. 11, 2004.

BACKGROUND OF THE INVENTION

This invention relates to a synchronous controller.

Programmable controllers (PLCs) are coming to be used as control units for factory automation set in a production factory and at a production site. Such a PLC is typically formed by appropriately combining a plurality of various types of units such as a source unit for supplying electric power, a CPU unit for the overall control of the PLC, an input unit for inputting signals from switches and sensors that are positioned at appropriate places of a production apparatus or an equipment of the factory automation, an output unit for transmitting control outputs to actuators, etc. and a communication unit to be connected to a communication network. These units are electrically and mechanically connected together through a connector provided on their side surfaces and are adapted to receive electrical power from the source unit and to transmit and to receive various data.

The control by the CPU unit of a PLC is carried out by cyclically repeating various steps such as taking in signals inputted through the input unit into the I/O memory of the CPU unit (IN-refresh), carrying out logical calculations according to a user program prepared in a preliminarily registered program language (such as the ladder language), transmitting the results of the calculations to the output unit by writing them in the I/O memory (OUT-refresh) and carrying out what is commonly referred to as peripheral processes.

There may be so-called advanced units adapted to carry out intelligent controls among the plurality of unit that comprise a PLC. There are various kinds of advanced units such as process control units having the function of carrying out a dedicated program of a process control (analog control), say, for carrying out a PID control by receiving an analog value such as temperature and motion control units for carrying out a motion control. Motion control units are adapted to control the driving of a plurality of motors, including those for controlling the positioning of an object of a driving system by way of three directions of axes (the x-axis, y-axis and z-axis). What is known as the synchronous controller is another example of motion control unit, having the function of synchronizing the motions of the axes when a multiple-axis control is carried out.

Common examples of synchronous controllers of this type include those with the control function of 2 to 4 axes provided within the controller as described in Japanese Patent Publication Tokkai 2003-202907 and those having the network format to provide a multiple-axis (6 or more axes) control function as described in Japanese Patent Publication Tokkai 2001-331222. The internally contained controller type and the network type may also be of the type of using a common memory and an interrupt signal or a communication command as the means for synchronization.

There have been problems with such conventional devices. For example, when a multiple-axis control is processed by a single main CPU, its control capability depends largely on the processing capability of this main CPU. Thus, if a multiple-axis control of the type that affects the capability of the main CPU is attempted, the capabilities required of the main CPU will quickly increase and it will soon become a very expensive controller. For a user requiring only controls of a smaller number of axes, such a controller would be an overkill.

From the point of view of structure, the method of using a single unit housing to contain the control function results in a large housing because a motor control interface for many axes must be contained, and this will require a large installation space. Especially for a user who requires only controls of a small number of axes, the requirement of a large housing structure is a disadvantage.

If the main CPU of a controller is adapted to carry out the motion control by the network format, furthermore, the data transmission ratio becomes 1:N where N is the number of the motors, etc. for one main CPU and there may be situations where time lags in the data transmission appear among the motors and this may cause mismatching among the axes in the synchronization motion control. Since the communication cycle will increase with the number of axes, the magnitude of mismatching also increases in proportion with the communication cycle.

In the communication network format, synchronization may be attained by transmitting the command value to each axis preliminarily and providing start commands all at once but the process load by the main CPU increases with the number of axes to be controlled and the communication cycle will also increase. Thus, the capability regarding response to external data is adversely affected.

SUMMARY OF THE INVENTION

It is therefore an object of this invention to provide a synchronous controller capable of providing a high-performance controller according to the necessary number of axes, easily synchronizing modules, reducing as much as possible the effects on the calculation processing by the control module for the object of control and reducing the load on each of the modules.

A synchronous controller according to this invention may be characterized as comprising a cycle master module and one or more control modules doubly connected through a synchronous bus and an event bus. The event bus is for transmitting a significantly larger volume of data than the synchronous bus. The control modules each serve to cyclically carry out execution of a user program for controlling an object apparatus to be controlled, and the cycle master module serves to exchange data with an external apparatus other than the object apparatus and to exchange data with the control modules through the event bus and the synchronous bus. Each of the control modules is adapted to carry out one cycle of the execution of the user program by using reception of synchronous data transmitted from the cycle master module through the synchronous bus as a trigger.

Thus, a controller such as a motion controller according to this invention may have the synchronous function and is of a structure with modules, including a cycle master module and motion control modules, each being provided with a program created by the user and the function of executing this program. These modules come to commonly own (share) the same data after each cycle of their operations and their common memory areas are made utilizable by the user program. The synchronous data that are always owned commonly can be referenced freely by the user program of any of the modules and all such synchronous data can be referenced. Thus, any application can be created by a plurality of synchronous data.

Since the user can form a synchronous controller by adding a control module according to the application, the invention can effectively contribute to the saving of space and cost reduction.

Since the modules are connected by two buses including the synchronous bus and the event bus, the former can be used efficiently for synchronization which requires speed and the constant characteristic although the data volume is relatively small, while the latter can be used for events involving a large volume of data although speed and constant time characteristic are of little importance.

Even for the control of a multi-axial motion, for example, the number of control modules can be appropriately determined such that an unreasonably large increase in the load on each CPU can be prevented.

When a plurality of control modules are used, since a user program can be provided to each of them, the application load can be appropriately distributed, and if the program is adequately designed, a controller with a high processing capability can be obtained.

The invention has merits even when only one control module is used because the control module can let the cycle master module to execute the events, transfer of a large amount of data and communication with external apparatus such that it can pay more attention to the control of the object apparatus.

There are different methods for setting the timing for transmitting the synchronous data from the cycle master module which serves as the standard of synchronization for each module. For example, the reception of synchronous data from all of the connected control modules may be used as the condition for the transmission of its own synchronous data. Another example may be to output the synchronous data at specified internals. A plurality of such set conditions may be prepared such that a selection may be switched appropriately.

It is preferable that a plurality of control modules be provided, each of them being adapted to receive synchronous data transmitted through the synchronous bus from another of the control modules, to store the received data at a synchronous data memory area and to use the stored data for the execution of the user program. According to this invention, a dedicated bus (the synchronous bus) is provided such that data can always be shared among these modules and that, for example, a plurality of axial motions can be synchronized. A dedicated event bus is also provided for exchanging voluminous data and a module with the cycle master function is further provided for generating the timing for each module to operate in synchronism. Thus, multi-axis synchronous control becomes possible over modules that may be of a dispersed structure.

The invention also relates to a control system which may be characterized as comprising one of more control modules including one connected to an object apparatus to be controlled, a cycle master module adapted to exchange data with each of these control modules and a synchronous bus that connects each of the control modules with the cycle master module. The cycle master module is adapted to cyclically carry out a synchronous bus refresh process by exchanging synchronous data with each of the control modules through the synchronous bus and thereby coming to share data with these control modules and a specified process by executing a user program based on the exchanged synchronous data. Each of the control modules is adapted to cyclically carry out a synchronous bus refresh process by exchanging synchronous data with the cycle master module and the others of the control modules through the synchronous bus and thereby coming to share data with the other modules and a specified process by executing a user program on operations of the object apparatus. Each of the control modules is synchronized by the synchronous bus refresh process of the cycle master module and one of these modules sequentially comes to serve to transmit the synchronous data simultaneously to the other modules by each synchronous bus refresh process of the cycle master module and the control modules such that the synchronous data come to be shared by all of the modules.

With the synchronous controller and the control system of this invention as described above, it is preferable that the number of the control modules be made variable. If a synchronous controller is structured with modules each provided with a control function of one axis or two axes, a CPU for the control and a programming function for executing a user program necessary for its control, a controller with a high level of performance can be obtained according to the number of axes to be controlled. As the object to be monitored changes, furthermore, the number of control modules can be changed conveniently so as to maintain an optimum condition.

It is preferable to further provide means for selecting by system setting the kind of synchronous data to be exchanged by each of the modules through the synchronous bus. Each of the control modules is preferably provided with an interface for exchanging data directly with the object apparatus to be controlled such that a high-speed feedback characteristic can be obtained.

Communications among the modules are carried out sequentially as each of the modules becomes the transmitter in turn and simultaneously transmits synchronous data all at once such that all modules come to share the same data.

In summary, a high-performance controller can be formed by this invention according, for example, to the number of axes that are necessary. Synchronism among the modules can be established easily and effects on the control calculations can be limited as much as possible and the load on each module can be reduced.

DETAILED DESCRIPTION OF THE INVENTION

Figure 1:
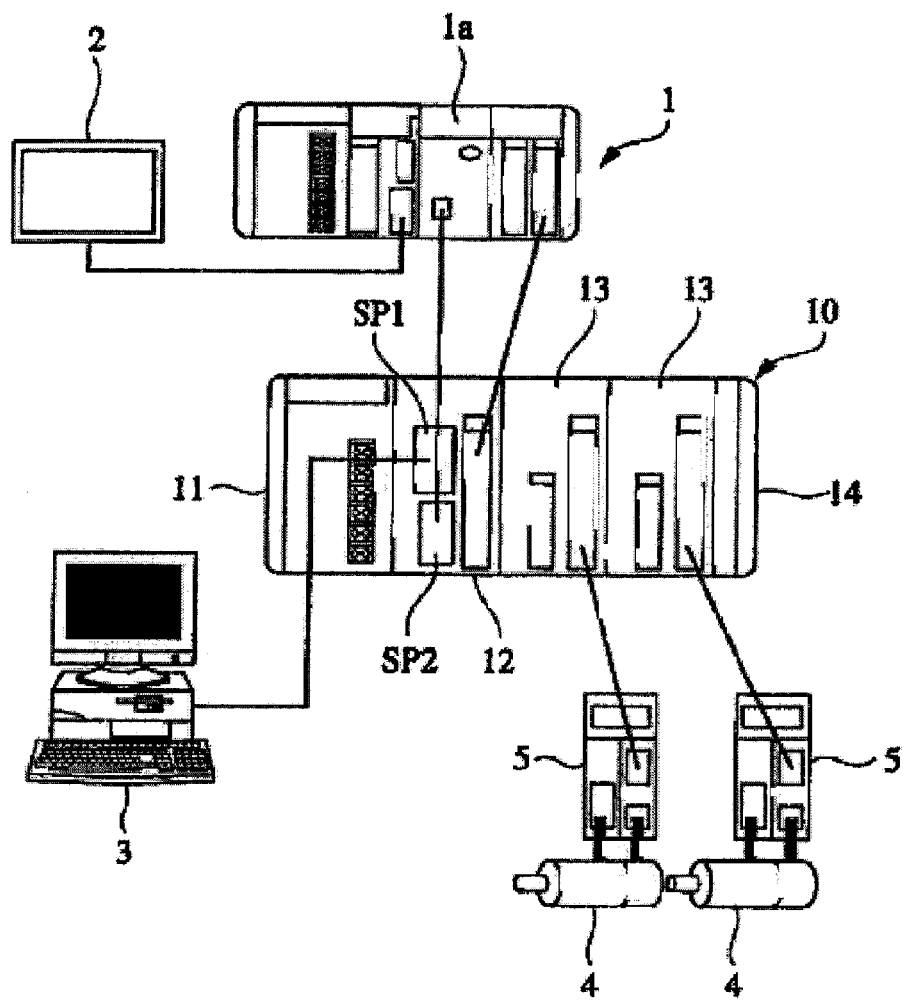
FIG. 1 is a system diagram showing a preferred embodiment of this invention.

FIG. 1 shows the entirety of a factory automation system including a synchronous controller 10 embodying this invention connected to a host controller 1 such as a PLC to which is also connected a display device 2. The synchronous controller 10 is adapted to receive a command from the host controller 1, to carry out a control according to the received command and to return its results back to the host controller 1.

The synchronous controller 10 is comprised of a power module 11, a cycle master module 12, motion control modules 13 and an end module 14. In other words, a plurality of motion control modules 13 are connectable to a single cycle master module 12. The cycle master module 12 and the motion control modules 13 each have a user program installed to be carried out cyclically.

According to this example, a programming tool 3 is connected to a serial port SP1 of the cycle master module 12 and the user program of the cycle master module 12 is directly uploaded and downloaded to and from the cycle master module 12. The user program of each motion control module 13 is uploaded and downloaded through the cycle master module 13. Another serial port SP2 of the cycle master module 12 is connected to a CPU unit 1a of the host controller 1.

The motion control modules 13 are adapted to be synchronously controlled by the cycle master module 12 and to output control signals to servo drivers 5 as the user programs of the motion control modules 13 are executed. The actual controls of motion are effected as these servo drivers 5 control servomotors 4 which are the objects of their control.

The cycle master module 12 is provided with the function of executing its own user program by receiving a command from the host controller 1, the function of generating the timing for synchronously activating each motion control module on the basis of the results of this execution, the function of reporting the results of this processing to the host controller 1 when it is finished, the function of communicating with the programming tool 3 and the (gateway) function of exchanging data between itself or the motion control modules 13 and an external apparatus such as the host controller 1 and the display device 2. Although FIG. 1 shows the motion control modules 13 and servo drivers 5 as separate components, they may be structured such that the motion control modules 13 include the servo drivers 5.

To compare the prior art example with the instant example, when a motion control unit was connected as one of advanced units to a conventional PLC, both the function of controlling motion and the function of communicating with the CPU units forming the PLC were installed. The motion control unit executed the user program and carried out the peripheral process cyclically, the motion control being effected while the user program was executed and communications with the CPU unit being done during the execution of the peripheral processes. According to the present embodiment, the motion control function and the peripheral processing function of the conventional motion control unit are carried out separately by different units and the motion control module 13 connected to the cycle master module through a bus is adapted to carry out the processes related to the motion control. This is how a high-speed control with high accuracy becomes possible.

Since a plural number of motion control modules 13 can be connected and disconnected, the number of the motion control modules 13 to be connected can be increased and decreased, depending on the purpose of use, and hence a control structure can be formed so as to suit the application. The cost and the space occupied will also be what will be required and sufficient. Since the processes to be carried out by the individual modules can be dispersed, each module having the user program individually, the processing capability is not adversely affected although a plurality of modules are used for the structure.

If a plurality of motion control modules 13 are connected, a synchronous bus to be described below can be made use of such that I/O data held by the other motion control module 13 can be obtained quickly and made use of by each module. Thus, for example, it becomes possible for one motion control module having the pulse input/output function to obtain analog input data from another motion control module having the analog input/output function through the synchronous bus and to use them as if they were input/output data contained by itself, say, for its own pulse output control. This makes it possible to carry out complicated controls quickly and accurately.

Figure 2:
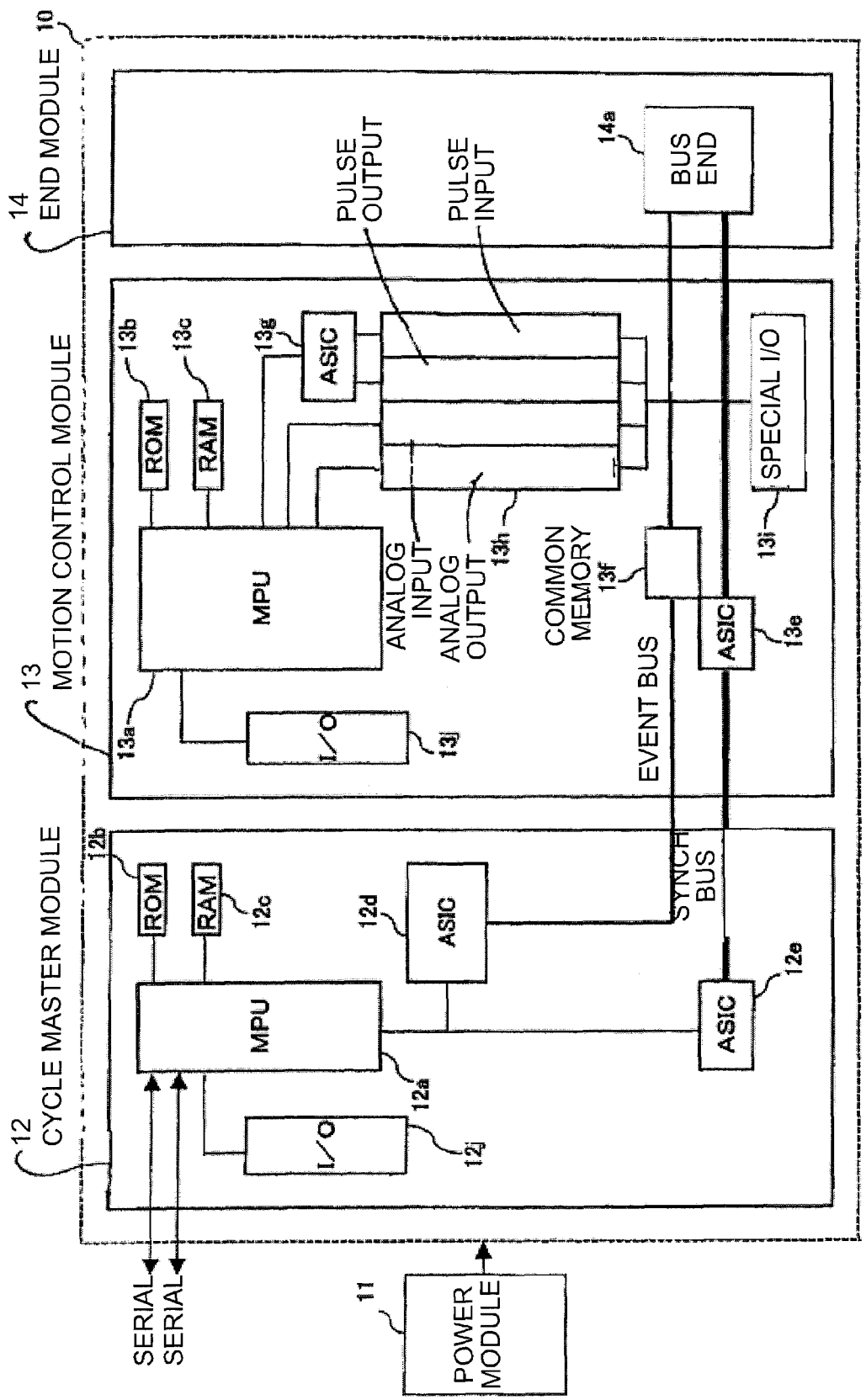
FIG. 2 is a block diagram showing the hardware structure of a synchronous controller of this invention.

Next, module structures for such functions as described above will be explained. FIG. 2 shows their hardware structure and FIG. 3 show their inner image (software structure).

According to the illustrated embodiment, the cycle master module 12 and the motion control module 13 are each provided with an MPU 12a and 13a, a ROM 12b and 13b and a RAM 12c and 13c. The system software of each module is stored in its MPU 12a or 13a or ROM 12b or 13b. These ROMs 12b and 13b may be flash ROMs and the user program created by the user is also backed up in these ROMs 12b and 13b.

Figure 3:
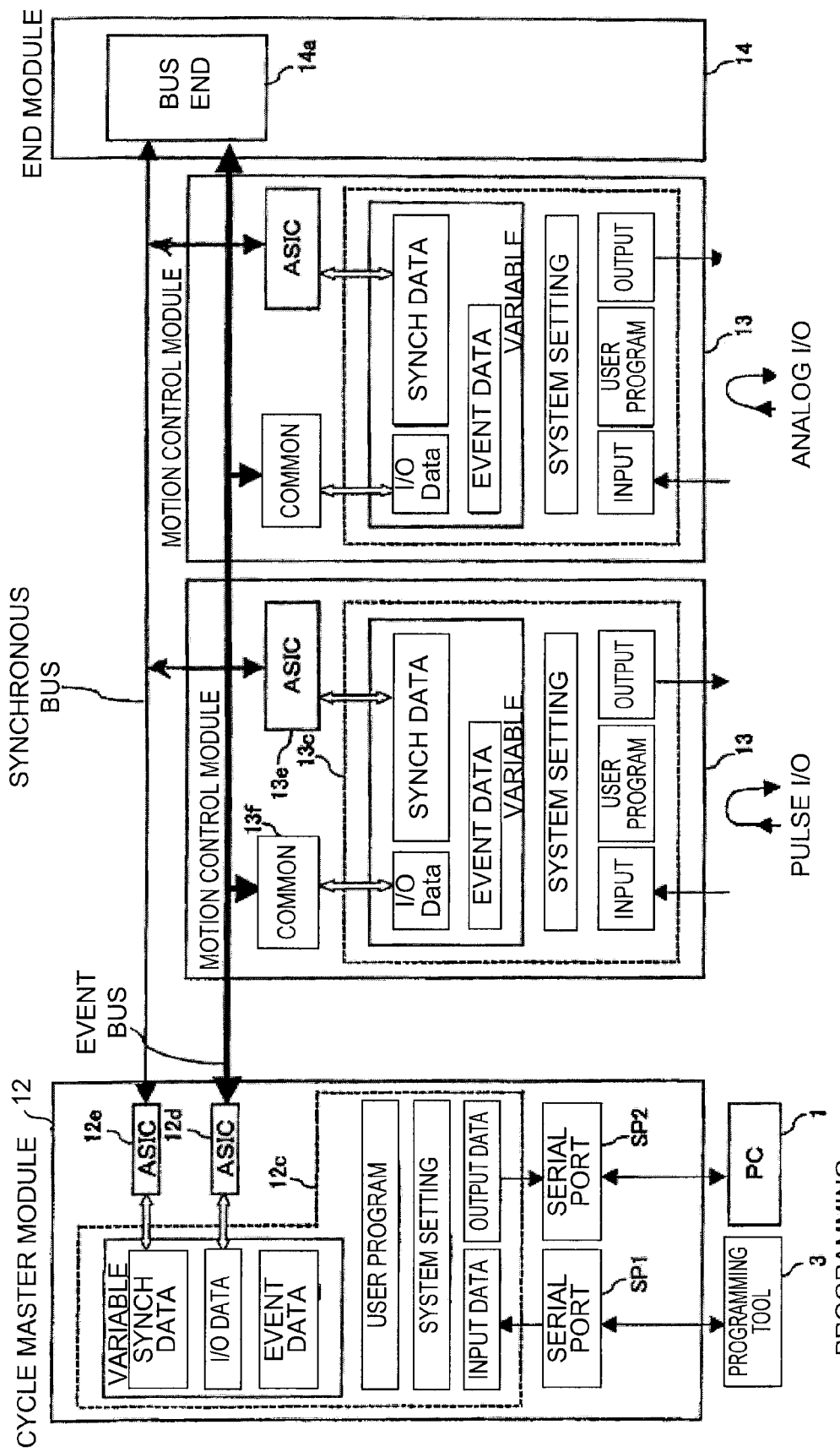
FIG. 3 is a block diagram showing the software structure of the synchronous controller of FIG. 2.

As shown in FIG. 3, a user program area, a variable area and a work area are set inside the RAMs 12c and 13c. When the user program is executed, it is developed from the ROM 12b or 13b to the RAM 12c or 13c as power is switched on.

Variable areas (memories) are areas to be used by the user program for saving I/O data of each module 12 and 13 and the data that are exchanged between them. Work areas are used by the system software of each module 12 and 13 for system execution.

The functions of the MPUs 12a and 13a, the ROMs 12b and 13b and the RAMs 12c and 13c are basically the same as those of the components installed in the CPU unit and the motion control units of the PLC.

The motion control module 13 is further provided with pulse input/output and analog input/output circuits 13h for controlling I/O apparatus (external apparatus) inclusive of objects of control such as servomotors and each of these input/output circuits is adapted to be connected to an external I/O apparatus through a special I/O port 13i. Examples of the I/O apparatus that may be connected include the servo drivers 5 shown in FIG. 1 for controlling the servomotors 4. Input signals obtained from such external I/O apparatus (input apparatus) are provided to the MPU 13a (through an ASIC 13g from the pulse input circuit). Data from the MPU 13a to an external IO apparatus (output apparatus) are transmitted through the analog output or pulse output circuit 13h.

Although the motion control module 13 was shown as being provided with both the pulse and analog input/output circuits 13h for making a common structure, they need not all be used in an actual operation. Only the pulse or analog circuits may be used and only the input or the output circuits may be activated. Such a choice is determined by system setting (FIG. 3). Not only these pulse and analog input/output circuit but also a communication interface may be provided as external interface to the motion control module 13.

The cycle master module 12 and the motion control module 13 are further provided with an I/O port 12j and 13j as an external interface such that data can be exchanged between the apparatus connected to the I/O port 12j or 13j and the MPU 12a or 13a. In other words, the motion control module 13 has both a general-purpose (pulse or analog) I/O function part for the direct motor control and another I/O function part for obtaining data directly from external apparatus (such as ON/OFF sensors, analog sensors and encoders).

Each module repeats cyclically the execution of the user program based on input data obtained from each of the interfaces described above such as the I/O ports 12j and 13j and the special I/O port 13j and outputting the obtained results through a specified external interface. (Details of processing for each cycle will be described below with reference to FIGS. 6 and 7.)

Since the general-purpose interface can thus be used for the motor control, an appropriate commercially available motor may be selected. Since the motor control means operate on pulse and analog signals, furthermore, commands can be outputted continuously and hence a more smooth control becomes possible, compared to a communication network.

The motor control by each module takes the form of having a dedicated CPU for a few axes (in units of one or two) such that data can be inputted directly from outside and pulse or analog commands can be outputted to the motor. Thus, it becomes either a pulse or analog interface type for a motor and hence a selection can be made from a wide variety of general-purpose products. Moreover, since data can be taken in directly from external apparatus and there is no time lag unlike by the communication type, a quick response capability can be realized.

Moreover, the modules are each connected both by the event bus and by the synchronous bus, and the end module 14 is provided with a bus connection end function 14a as the end of these buses. Each motion control module 13 is provided with a common memory 13f connected to the event bus and the cycle master module 12 is provided with an event transmission ASIC 12d connected to the event bus. The event transmission ASIC 12d has the function of interpolating data transmission when the cycle master module 12 accesses the common memory 13f of a motion control module 13, the motion control module 13 serving the function of a gateway by using this event transmission ASIC 12d. When an event or a program is transmitted from the host controller 1 or the programming tool 3 to a motion control module 13, for example, it is saved in the common memory 13f or the corresponding motion control module 13 (identified, for example, by the module number). Each motion control module 13 is also adapted to carry out the function of reading out data stored in the common memory and return them to the external host controller 1, etc. as the response to an event.

Data that are transmitted through the event bus are usually voluminous and require a long time for transmission. Thus, if they are transmitted at the time of the peripheral services that are carried out cyclically, as done by conventional motion control units, there is the danger of interfering with its primary function of motion control. According to the present invention, there is no such danger of interference with the motion control because the time-consuming data transmission is carried out by the cycle master module 12 which is not adapted to carry out any motion control. Moreover, since an event bus is provided apart from the synchronous bus for carrying out the synchronous control, data transmission for the synchronous control can be carried out through the synchronous bus in parallel with the access to the common memory 13f and there is no interference with the synchronous control.

Synchronization ASICs 12e and 13e connected to the synchronous bus are respectively installed within the modules 12 and 13 and the MPUs 12a and 13a are respectively connected to the synchronization ASICs 12e and 13e. These ASICs 12e and 13e are each adapted to be able to simultaneously transmit data to all of the ASICs 12e and 13e in all the other modules connected to the synchronous bus by the so-called data-link method, having a buffer area inside for temporarily saving transmission and reception data. In other words, as data are outputted from a synchronization ASIC to the synchronous bus, the other ASICs of the other modules can accept the outputted data and take them into their internal buffer areas. Thus, each of the plurality of modules can become the transmitter of data sequentially and simultaneously send off data to the other modules such that all modules can come to share the same data in common. Details of the setup for transmitting and receiving data through the synchronous bus according to this invention will be explained further below.

Thus, each module is connected by these two buses and the modules each carry out the user program contained thereby by exchanging data among them through these two buses. Those of the data that must be shared in common for each cycle, although small in volume, are exchanged by using the synchronous bus capable of high-speed transmission while those data of large volume that need not be shared in common for each cycle are transmitted through the event bus.

In summary, since two buses of different characteristics connect the modules, the data that are required to be shared among the modules for each cycle of the operation are not affected by any occasional occurrence of voluminous data (event) to be exchanged.

Thus, each module can make use of not only data from its own I/O contained by itself but also any other data that are exchanged through the synchronous and event buses by the system operation and the user program can be executed by freely using such data. The results of calculations obtained by executing the user program are outputted from the I/O of its own module or as exchanged data through the synchronous and event buses.

Figure 4:
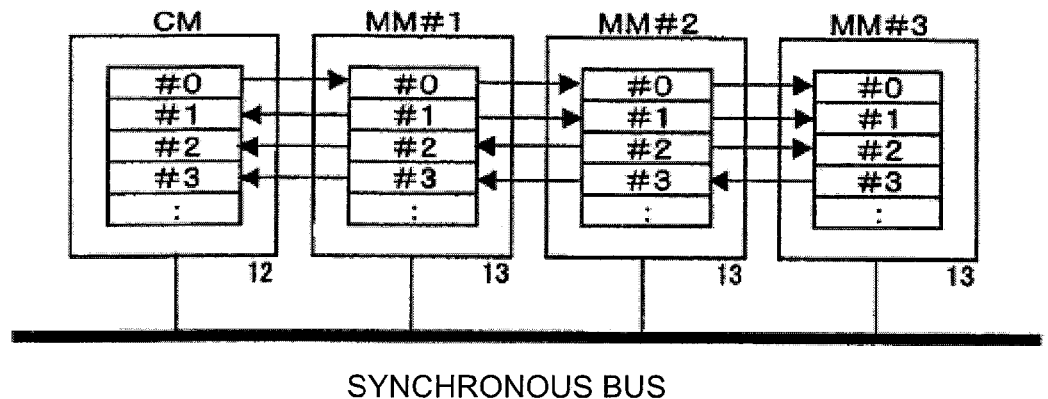
FIG. 4 is a schematic diagram for explaining the synchronous control by using the synchronous bus.

FIG. 4 shows schematically the aforementioned process for sharing data by using the synchronous bus. In this example, three motion control modules 13 with module numbers #1, #2 and #3 are connected and the cycle master module 12 is assigned the module number #0.

Data that come to be shared among the modules without the synchronous bus by the data-link method using the synchronization ASICs 12e and 13e, inclusive of those for all modules, are transmitted to and stored in the synchronous data areas in the variable memories of the RAMs 12c and 13c. The synchronous data areas are allocated to the individual modules as shown in FIG. 4. Since data in all modules are shared after each cycle, each module can reference all synchronous data of all modules by referencing the synchronous data area of its own.

The cycle master module 12, for example, stores those of the data managed by itself in memory area #0 and transmits at a specified timing the data stored in memory area #0 to the motion control modules 13. Each of the motion control modules 13, upon receiving those transmitted data, stores them in an memory area allocated within memory area #0 of the synchronous data area within its own variable memory. Explained more in detail, this is carried out by the "synchronous bus refresh" whereby data that are temporarily stored in the buffer area inside the synchronization ASIC are transmitted to the synchronous data area at a specified timing.

As each of the motion control modules 13 (such as #1) transfers data managed by it, the other motion control modules 13 (such as #2 and #3) and the cycle master module 12 receive the data from #1 and store the received data in allocated memory area #1 inside their synchronous data areas.

The sharing of data is carried out in each cycle. Data that are transmitted by each module are referenced by the other modules for carrying out their user programs. Since the data in the synchronous data area of each module are updated after each cycle of operations, the calculations are carried out on the basis of the newest data and hence a more accurate control appropriate for the moment can be carried out.

Figure 5:
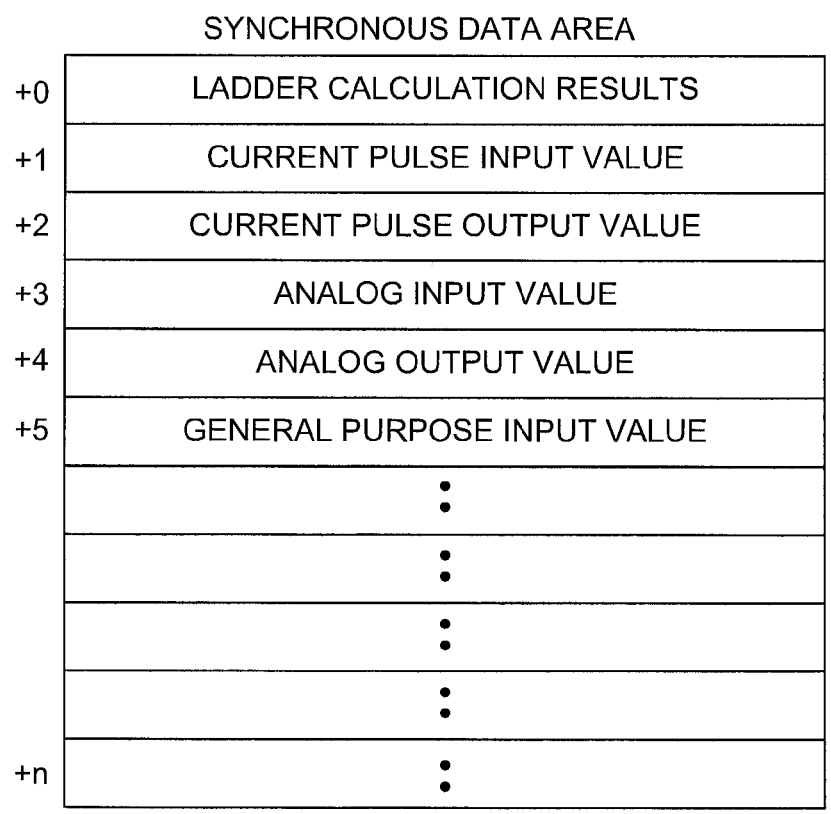
FIG. 5 is a drawing for explaining the kinds of synchronous data.

The kind of data to be thus transmitted and received through the synchronous bus can be freely selected out of the data stored in each module as shown in FIG. 5. Data that can be shared as synchronous data include the results of calculations generated by executing the user program but are not so limited and may also include the newest I/O values of its own module. When the I/O data of one's own module are to be made into synchronous data, they may be registered by the system setting of one's own module and the registered data are automatically transferred and exchanged as synchronous data by the system. Synchronous data areas (+0, +1, . . . , +n) shown in FIG. 5 correspond to one memory area of FIG. 4 (such as memory area #1) and n may take value in each area. In other words, the memory areas may each have a different data capacity.

According to the instant example, the sharing of synchronous data among the modules is effected by two processes which are the "synchronous data transmission/reception" and the "synchronous bus refresh." The synchronous data transmission/reception corresponds to a series of data transmission/reception in which each of the motion control modules 13 simultaneously transmits its own synchronous data sequentially to the synchronous bus and the other modules (each motion control module and the cycle master module 12) receive the transmitted data. The synchronous data transmission/reception also corresponds to the simultaneous transmission of synchronous data by the cycle master module 12 to the synchronous bus and the reception of the transmitted data by the motion control modules 13. The synchronous data transmission/reception by the cycle master module 12 is effected after the series of synchronous data transmission/reception by all of the motion control modules 13 is completed and as the cycle master module 12 recognizes it.

The synchronous bus refresh corresponds to the transmission and storage of all synchronous data by each module from the buffer area of its synchronization ASIC 12e or 13e to an assigned memory area inside the synchronous data area of the variable memory 12c or 13c. This is carried out by the completion of the series of synchronous data transmission/reception by all motion control units 13 and the synchronous data transmission/reception by the cycle master module 12.

The synchronous bus refresh may be carried out in a plurality of different ways. According to one example, each motion control module 13 operates so as to transfer and store all synchronous data into the synchronous data area from the buffer area of the synchronization ASIC 13e in correlation with the reception of the synchronous data transmitted simultaneously from the cycle master module 12. According to another example, the cycle master module 12, after simultaneously transmitting the synchronous data to the synchronous bus, further transmits trigger signals simultaneously for the synchronous data refresh process to the motion control modules 13. In the latter example, it is not that each motion control module 13 carries out the synchronous bus refresh in correlation with the reception of the synchronous data transmitted simultaneously from the cycle master module. The synchronous bus refresh process is carried out with the synchronous bus refresh processing trigger signal serving as the trigger.

Next, the synchronization of processes among the motion control modules 13 will be explained. Since each motion control module 13 is adapted to receive the synchronous data from the cycle master module 12 after the synchronous data from all the other motion control modules 13 are received, it may be concluded the transmission/reception of synchronous data for the current cycle has been completed when the synchronous data from the cycle master module 12 have been received. Thus, each motion control module 13 carries out the synchronous bus refresh by using the reception of the synchronous data from the cycle master module 12 as the trigger and carries out the calculation process of the user program, or the processes of one cycle shown in FIG. 6, that is, the processes specific to the conditions ("the specific processes") and the peripheral service processes. In this way, the motion control modules 13 are able to carry out the calculation processes in synchronism with one another.

Figure 6:
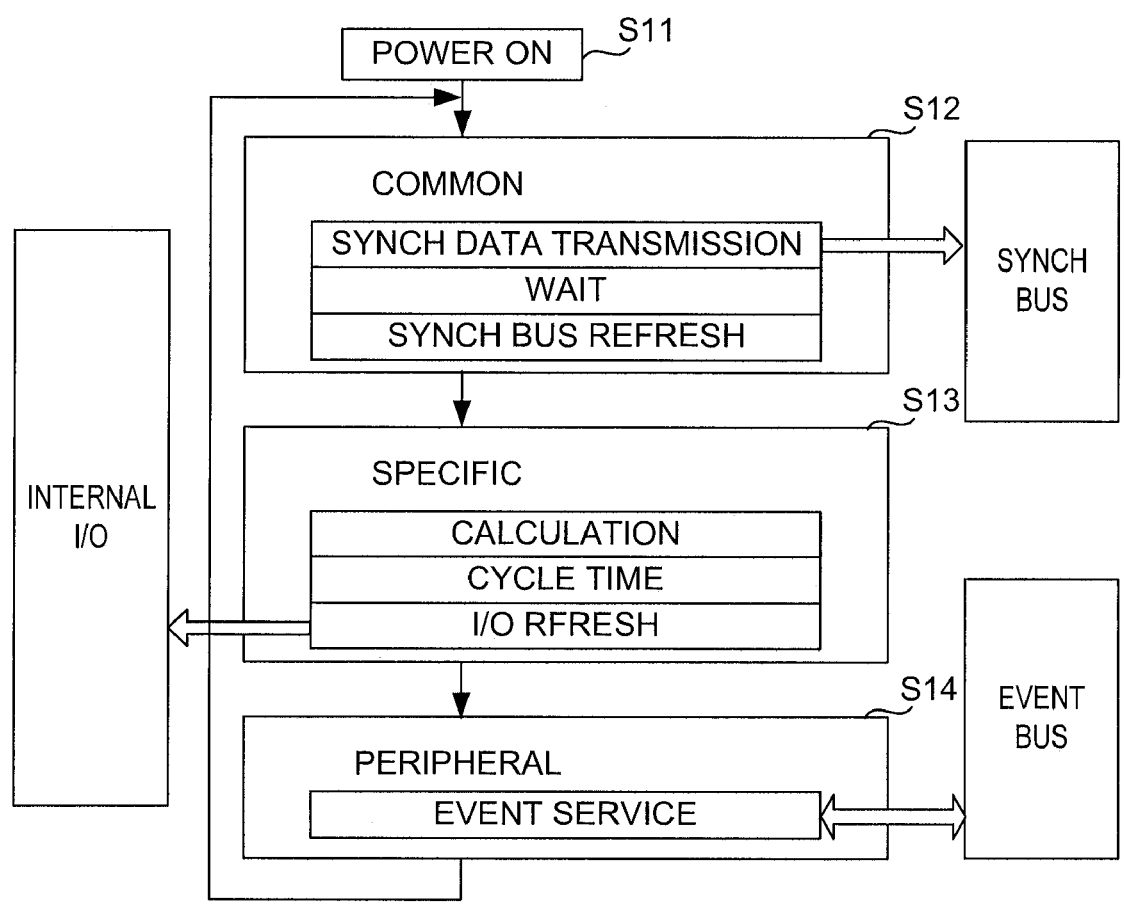
FIG. 6 is a flowchart for showing the processing function of a motion control module.

In the above, "synchronous data reception as trigger" includes situations where the synchronous bus refresh processing trigger signal from the cycle master module 12 is used as the trigger, as in the second example of the aforementioned synchronous data refresh processing. In this case, each motion control module 13 carries out the processing of one cycle as shown in FIG. 6 by using the synchronous bus refresh processing trigger signal from the cycle m aster module 12.

Figure 7:
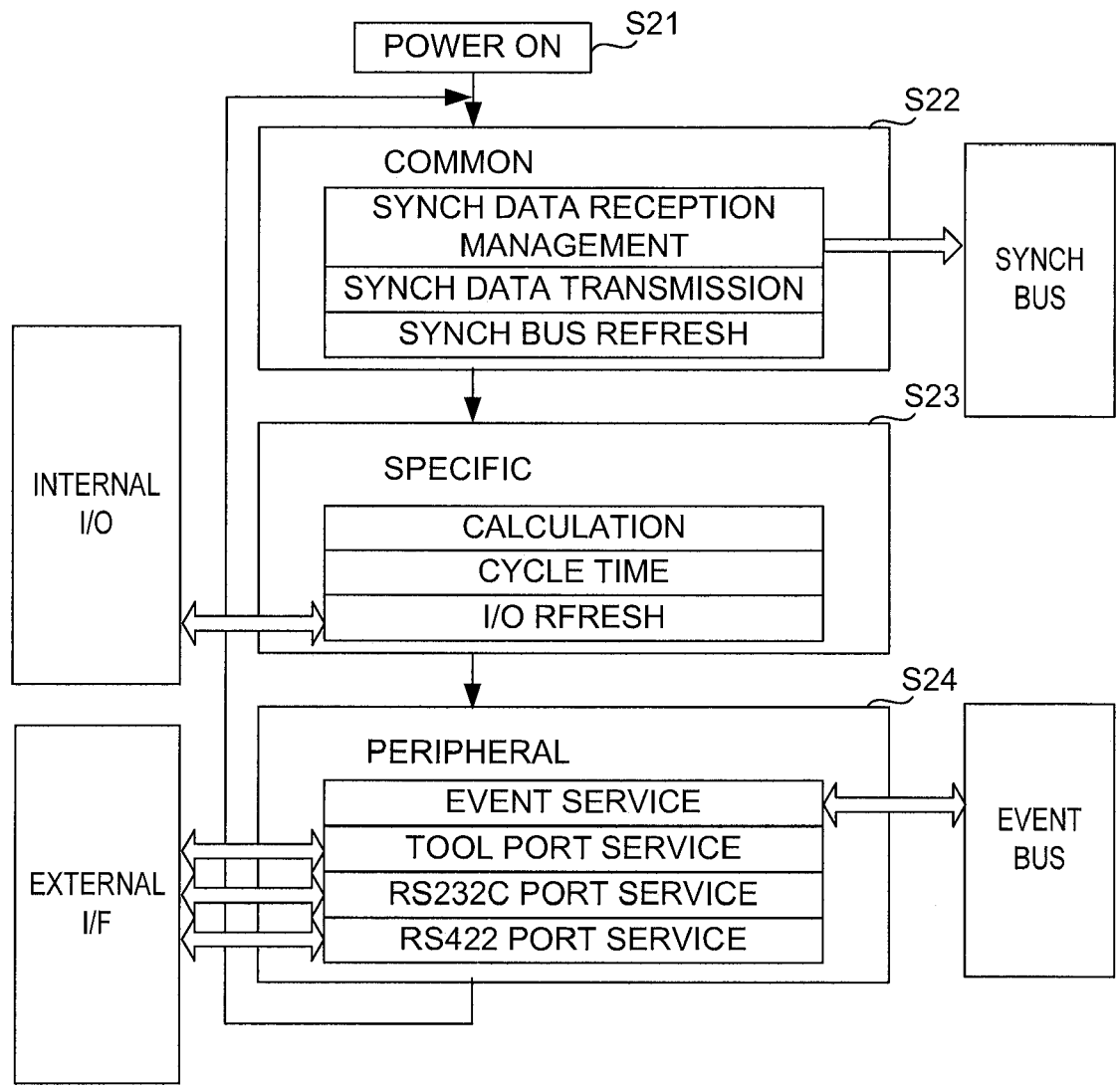
FIG. 7 is a flowchart for showing the processing function of the cycle master module.

Details of operations by the cycle master module 12 are shown by the flowchart of FIG. 7. After the initialization process is carried out (Step S21) as power is switched on, the cycle master module 12 carries out the synchronous data reception management, the synchronous data transmission and the synchronous bus refresh as the common processes (Step S22). The synchronous data transmission/reception by the cycle master module means to monitor whether or not the series of synchronous data transmission/reception by all of the motion control modules has been completed and to transmit the synchronous data of its own module simultaneously to the synchronous bus. The synchronous bus refresh is the process of transmitting and storing the synchronous data received from all motion control modules from the buffer areas of ASIC 12e to the synchronous data area. If the synchronous bus refresh process trigger signal is outputted from the cycle master module 12, as explained above, the trigger signal output process is also included.

The cycle master module 12 is also adapted to carry out these common processes by an interrupt process, as will be explained more in detail further below.

After the synchronous bus refresh is completed, the user program is executed, and after the cycle time is calculated, its own I/O refresh is carried out as a specific process (Step S23). The I/O refresh process includes the process of storing the results of calculation as the synchronous data of the next cycle in a special area of the synchronous data of the variable memory 12c.

The peripheral service processing is carried out next (Step S24). The cycle master module 12 carries out not only the exchange of events, etc. with the motion control modules 13 through the event bus but also communications with external apparatus such as the host controller 1 and the programming tool 3. Thus, the cycle master module 12 serves to exchange data that do not require a high-speed exchange through the event bus service and to issue events to the motion control modules 13 through the event bus service in response to a service request from a connected peripheral device. The common process (Step S22), the specific process (Step S23) and the peripheral processes (Step S24) are repeated cyclically.

Details of operations of the MPU 13a of a motion control module 13 are explained next by way of the flowchart of FIG. 6. After an initialization process is carried out (Step S11) as power is switched on, common processes are carried out (Step S12), inclusive of the process of simultaneously transmitting its own synchronous data to the synchronous bus, a wait process and the synchronous bus refresh. The wait process will be explained further below with reference to FIG. 8.

After the wait process, when the ASIC 13e receives synchronous data from the cycle master module 12, this serves as the trigger for the synchronous bus refresh. By the synchronous bus refresh, the synchronous data received by the ASIC from the other motion control modules 13 and the synchronous data from the cycle master module 12 are transmitted to and stored in the synchronous data area 13e as the reception of the synchronous data transmitted from the cycle master module 12 through the synchronous bus by the ASIC 13e serves as the trigger. As all of the motion control modules 13 carry out the same processes, their timing can be matched with the reception of synchronous data from the cycle master module 12 serving as the trigger such that the next specific process (Step S23) can be started in synchronism. The reception of the synchronous bus refresh process trigger signal as explained above may be used as the trigger.

After the synchronous bus refresh is completed, calculation processes for the user program are carried out as a specified process (Step S23). After the cycle time is calculated, the I/O refresh is carried out on itself. This I/O refresh includes the process of storing the results of the calculation processes as synchronous data of the next cycle in a specified area of the synchronous data of the variable memory 13c.

The peripheral service process includes the exchange of data such as events through the event bus in the case of a motion control module. Since it is seldom carried out, the routine normally returns to Step S12 immediately to carry out the common processes.

Thus, since the synchronous bus refresh is carried out before each module carries out its calculation processes, as shown in FIG. 6, it becomes possible for all modules to share the newest data obtained in the previous cycle, and synchronism can be established because the calculation processes are started by carrying out the synchronous bus refresh in synchronism with the synchronous data reception from the cycle master module 12.

Figure 8:
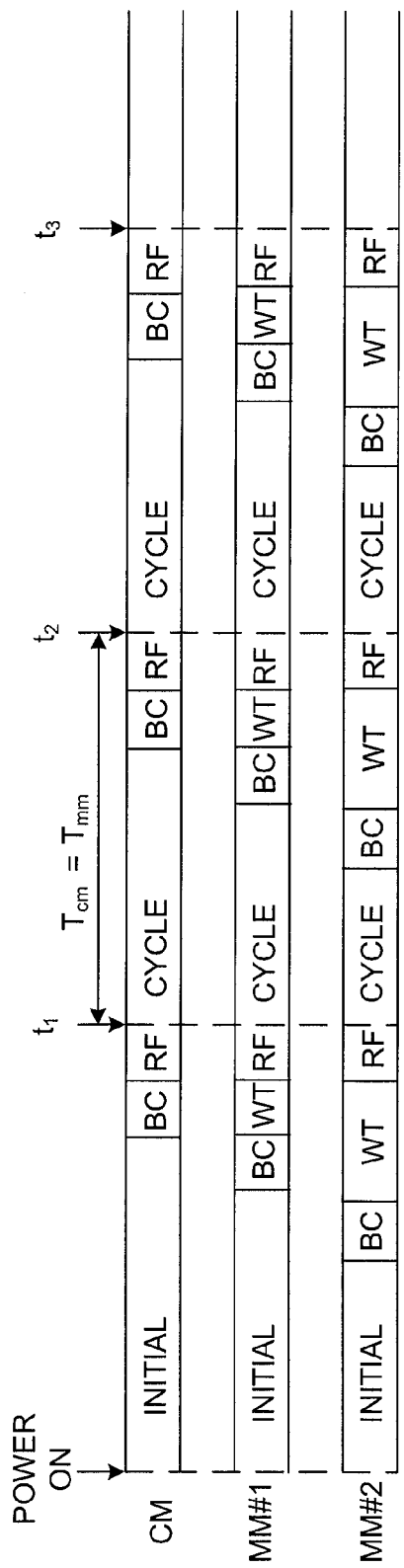
FIG. 8 is a time chart for showing the relationship between the synchronous process and the cyclic operations of each module.

Operations carried out in synchronism with one cycle of operations by the cycle master module 12 are shown as a timing chart in FIG. 8 wherein CM indicates the cycle master module 12 and MM#1 and MM#2 represent the motion control modules 13. The common processes of the motion control modules shown in FIG. 6 correspond to the synchronous data transmission (BC), wait (WT) and synchronous bus refresh (RF) by MM#1 and MM#2 shown in FIG. 8. The common processes by the cycle master module shown in FIG. 7 correspond to the synchronous data transmission (BC) and synchronous bus refresh (RF) of the cycle master module shown in FIG. 8. The synchronous data reception management shown in FIG. 7 is omitted in FIG. 8. The series of processes for carrying out the specific processes (S13 and S23) shown in FIGS. 6 and 7 and the peripheral service processes (S14 and S24) corresponds to the cyclic process (CYCLE) of each module shown in FIG. 8. Although not shown in FIGS. 6, 7 and 8, synchronous data transmitted to each module from another module while the former is carrying out the cyclic operations or the wait process are automatically taken into the buffer area of its ASIC.

In the example of FIG. 8, as the power source for the synchronous controller is switched on, motion control module MM#2 carries out the initialization process (INITIAL) and then transmits the synchronous data (BC of MM#2), corresponding to #2 of FIG. 2, that is, the synchronous data transmitted from the buffer area in the ASIC of motion control module MM#2 are received by another buffer area inside the ASIC 13e of motion control module MM#1. Then, motion control module MM#2 waits until the transmission of synchronous data of the cycle master module CM is completed.

Motion control module MM#1 also transmits synchronous data (BC) after the initialization process as power is switched on. This synchronous data transmission corresponds to #1 in FIG. 4. Thereafter, motion control module MM#1 carries out the wait process until the synchronous data transmission by the cycle master module CM is completed. The cycle master module CM transmits its own synchronous data (BC of CM) after acknowledging that all of the motion control modules have transmitted and received synchronous data. This synchronous data transmission corresponds to #0 in FIG. 4.

After all transmission and reception processes of synchronous data have been completed among all modules, this serves as the trigger for each module to carry out bus refresh by transmitting synchronous data from the buffer areas of ASIC 12e and 13e to the synchronous data area and store them therein.

Next, the cycle master module CM itself starts the process of one scan and both motion control modules MM# 1 and MM#2 also simultaneously start the process of one scan. Thereafter, the same process is repeated and the specific processes of each module are carried out at the same timing t2 and t3.

In another example wherein the cycle master module transmits all synchronous data at once to the synchronous bus and thereafter simultaneously transmits trigger signals for synchronous bus refresh to the motion control modules through the synchronous bus all at once, each of the motion control modules carries out the synchronous bus refresh process by using the synchronous bus refresh process trigger signal from the cycle master module 12 as the trigger, not in correlation with the reception of the synchronous data transmitted at once from the cycle master module 12.

By either example, the time of one period (Tcm) for the cyclic processes and the common processes by the cycle master module and the time of one period (Tmm) for the cyclic processes of the common processes by each of the motion control modules become the same.

Figure 9:
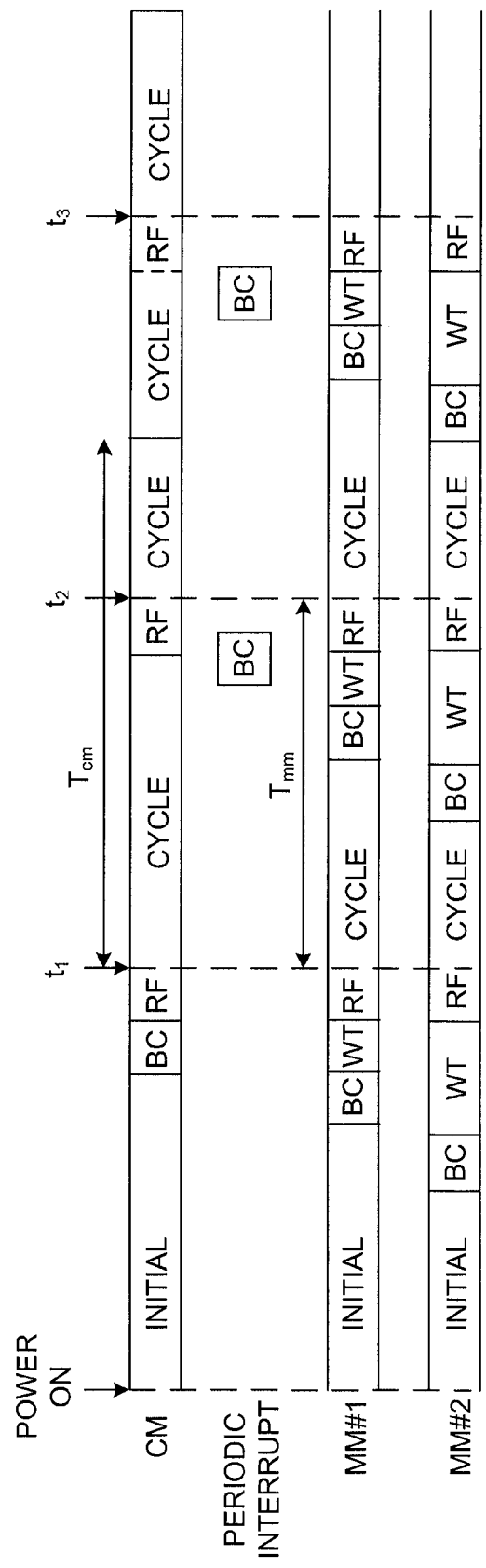
FIG. 9 is another time chart for showing the relationship between the synchronous process and the cyclic operations of each module when the cycle master module has a long cycle processing time.

When the cycle processing time of the cycle master module is long due to the size of the process load, the synchronous data transmission by the cycle master module may be separated from the common process and executed by a freely settable periodic interrupt process such that data can be shared and synchronism can be established among the motion control modules by carrying out synchronous bus refresh at a regular fast rate without being affected by the cycle processing time of the cycle master module. FIG. 9 shows an example where the cycle processing time of the cycle master module is long. In such a situation, methods of starting the cyclic processes of the motion control modules by using the synchronous data transmission by the cycle master module as the triggers are not desirable because the waiting time of each motion control module becomes too long. This can be prevented by omitting the synchronous data reception management from the common processing (Step S22) in the process flowchart of the cycle master module of FIG. 7 and the synchronous data transmission and synchronous bus refresh are carried out by periodic interrupt by a timer operating not in synchronism with the cyclic processes such that each motion control module 13 can start the next cycle of operations by using this as the trigger.

In this manner, the cycle time of the motion control modules 13 can be minimized although the cycle time of the cycle master module 12 may become large, say, due to the long time required of it for its peripheral services and the cycle time can be maintained stably constant. In other words, the period (Tmm) of the cyclic operations of the motion control modules 13 can be minimized compared to that (Tcm) of the cycle master module 12.

It is by the system setting by the cycle master module 12 that decides which of these two methods of operations described above should be selected. If synchronous data are not required by the modules, the system may be set such that the synchronous bus refresh is stopped and the processes are carried out singly by exchanging data only through the event bus not in synchronism.

What is claimed is:

1. A synchronous controller comprising:
   a cycle master module; and
   a plurality of control modules;
   said cycle master module and said control modules being doubly connected through a synchronous bus and an event bus which is for transmitting a significantly larger volume of data than said synchronous bus;
   said control modules each serving to cyclically carry out execution of a user program for controlling an object apparatus to be controlled;
   said cycle master module serving to exchange data with an external apparatus other than said object apparatus and to exchange data with said control modules through said event bus and said synchronous bus;
   each of said control modules being adapted to carry out one cycle of said execution by using reception of synchronous data transmitted from said cycle master module through said synchronous bus as a trigger;
   each of said control modules being adapted to receive synchronous data transmitted through said synchronous bus from another of said control modules, to store said received data at a synchronous data memory area and to use said stored data for said execution; and
   said cycle master module being adapted to output said synchronous data at constant time intervals.

2. The synchronous controller of claim 1 structured such that the number of said control modules is variable.

3. The synchronous controller of claim 1 wherein said cycle master module is adapted to transmit the synchronous data of its own on condition that the synchronous data have been received thereby from all of said control modules.

4. The synchronous controller of claim 1 further comprising means for selecting by system setting the kind of said synchronous data to be exchanged by each of said modules through the synchronous bus.

5. The synchronous controller of claim 1 wherein each of said control modules is provided with an interface for exchanging data directly with said object apparatus to be controlled.

6. A control system comprising:
   a plurality of control modules including one connected to an object apparatus to be controlled;
   a cycle master module adapted to exchange data with each of said control modules;
   a synchronous bus that connects each of said control modules with said cycle master module; and
   an event bus for transmitting a significantly larger volume of data than said synchronous bus;
   wherein said cycle master module is adapted to cyclically carry out a synchronous bus refresh process by exchanging synchronous data with each of said control modules through said synchronous bus and said event bus and thereby coming to share data with said control modules and a specified process by executing a user program based on said exchanged synchronous data;
   wherein each of said control modules is adapted to cyclically carry out a synchronous bus refresh process by exchanging synchronous data with said cycle master module and the others of said control modules through said synchronous bus and thereby coming to share data with the other modules and a specified process by executing a user program on operations of the object apparatus;
   wherein each of said control modules is synchronized by the synchronous bus refresh process of said cycle master module;
   wherein one of said modules sequentially comes to serve to transmit the synchronous data simultaneously to the other modules by the synchronous bus refresh process of the cycle master module and the control modules such that the synchronous data come to be shared by all of said modules;
   wherein each of said control modules is adapted to receive synchronous data transmitted through said synchronous bus from another of said control modules, to store said received data at a synchronous data memory area and to use said stored data for said execution; and
   wherein said cycle master module is adapted to output said synchronous data at constant time intervals.

7. The control system of claim 6 structured such that the number of said control modules is variable.

8. The control system of claim 6 wherein said cycle master module is adapted to transmit the synchronous data of its own on condition that the synchronous data have been received thereby from all of said control modules.

9. The control system of claim 6 further comprising means for selecting by system setting the kind of said synchronous data to be exchanged by each of said modules through the synchronous bus.

10. The control system of claim 6 wherein each of said control modules is provided with an interface for exchanging data directly with said object apparatus to be controlled.

11. A control system comprising:
    a plurality of control modules including one connected to an object apparatus to be controlled;
    a cycle master module adapted to exchange data with each of said control modules;
    a synchronous bus that connects each of said control modules with said cycle master module; and
    an event bus which is for transmitting a significantly larger volume of data than said synchronous bus;
    wherein said cycle master module is adapted to cyclically carry out a synchronous bus refresh process by exchanging synchronous data with each of said control modules through said synchronous bus and thereby coming to share data with said control modules and a specified process by executing a user program based on said exchanged synchronous data;
    wherein each of said control modules is adapted to cyclically carry out a synchronous bus refresh process by exchanging synchronous data with said cycle master module and the others of said control modules through said synchronous bus and thereby coming to share data with the other modules and a specified process by executing a user program on operations of the object apparatus;
    wherein each of said control modules is synchronized by the synchronous bus refresh process of said cycle master module;
    wherein one of said modules sequentially comes to serve to transmit the synchronous data simultaneously to the other modules by the synchronous bus refresh process of the cycle master module and the control modules such that the synchronous data come to be shared by all of said modules;

wherein each of said control modules is adapted to receive synchronous data transmitted through said synchronous bus from another of said control modules, to store said received data at a synchronous data memory area and to use said stored data for said execution; and wherein said cycle master module is adapted to output said synchronous data at constant time intervals.

12. The control system of claim 11 structured such that the number of said control modules is variable.

13. The control system of claim 11 wherein said cycle master module is adapted to transmit the synchronous data of its own on condition that the synchronous data have been received thereby from all of said control modules.

14. The control system of claim 11 further comprising means for selecting by system setting the kind of said synchronous data to be exchanged by each of said modules through the synchronous bus.

15. The control system of claim 11 wherein each of said control modules is provided with an interface for exchanging data directly with said object apparatus to be controlled.

* * * * *